Jan. 27, 1942.                K. R. ELDREDGE                2,271,478
                            HYDROGEN ION INDICATOR
                              Filed April 13, 1940

INVENTOR
Kenneth R. Eldredge
By
ATTORNEY

Patented Jan. 27, 1942

2,271,478

UNITED STATES PATENT OFFICE 2,271,478

HYDROGEN ION INDICATOR

Kenneth R. Eldredge, Berkeley, Calif.

Application April 13, 1940, Serial No. 329,484

12 Claims. (Cl. 175—183)

This invention relates broadly to an electrical testing apparatus and has particular application to the measurement of potentials in high resistance circuits, such as those found in pH measurements.

It has been found convenient in pH determinations to employ a voltaic cell having as an electrolyte the unknown solution or material to be tested, in which are immersed a pair of specially chosen electrodes, at least one of which makes electrical contact with the material through a thin glass wall, and is known as a glass electrode. The potential of the cell thus formed is a direct function of the pH of the material so that by measuring the cell potential the pH of the solution or other material constituting the electrolyte may be determined. It is a difficult problem to accurately measure the potentials of such cells because of the extremely high internal resistance which results from the use of the glass electrode.

Heretofore, it has been the practice to oppose the potential of the pH cell by means of a standard cell and a potentiometer. Standard cells of this type are only capable of delivering an extremely small current without permanent damage and their use is subject to difficulty because of the necessity for frequent checking and calibration. In addition, the bulk of a good standard cell is large for portable equipment and the indicating apparatus used to balance the potentiometer and pH cell outputs are delicate and unstable.

This invention utilizes a conventional pH cell with its glass electrode and opposes the potential of the cell with a variable potential, such as that delivered by an ordinary battery and a potentiometer. The problems of indicating when the two opposing potentials are accurately balanced and of measuring the value of the battery potential at the point of balance have been solved in a novel manner. Broadly, this comprehends the use of a condenser which receives a charge proportional to the difference between the cell potential and the battery potential and transfers it to an amplifier, the output of the amplifier being impressed upon an ordinary direct current measuring instrument which is also used to measure the potential of the battery and potentiometer. The steady reading of the meter gives the potential delivered by the potentiometer and battery opposing the potential of the pH cell and if the two potentials are accurately balanced there will be no difference of potential to be applied to the condenser and the amplifier so that on actuation of the charge transferring means there will be no deflection of the meter. If the two potentials are unbalanced a transfer of charge from the condenser to the amplifier will cause the needle of the meter to flick or be momentarily deflected in the direction of the unbalance so that the correction which must be applied to the potentiometer is known as to direction, and is substantially known as to its magnitude. Alternatively, a high resistance may be used in place of the condenser, as will be explained in detail below.

It is an object of this invention to provide an improved pH determination apparatus which does not require standard cells and which utilizes only a simple direct current meter for indicating potential and also for indicating the condition of balance between the battery potential and the cell potential.

Another object is to provide an improved apparatus for comparing potentials in high resistance circuits.

Another object is to provide an apparatus of this type which will not require frequent checking and which is easily calibrated for changes in the glass electrode.

Another object is to provide a potential comparison device which utilizes a condenser to transfer the difference of potential between the pH cell and the applied source of opposing potential, this difference being amplified and returned to give a momentary indication on the meter which is used to indicate the magnitude of the applied opposing potential.

These and other objects of this invention will be further apparent from the following description and from the accompanying drawing which forms a part of this specification and illustrates a preferred arrangement of the invention as applied to a pH meter.

In the drawing, Figure 1 is a connection diagram showing a simplified arrangement of this invention.

Figure 1:
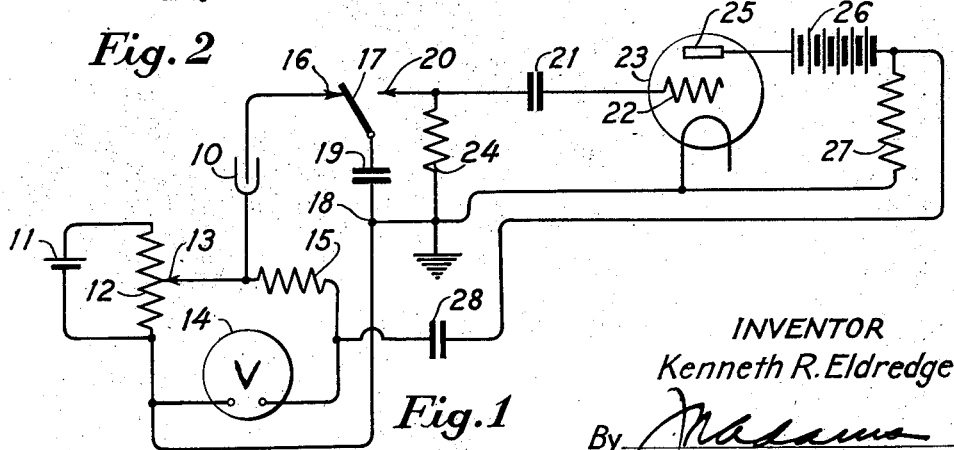

Referring to Figure 1, reference numeral 10 indicates a pH measuring cell into which the material to be tested is placed and one of whose electrodes is a glass electrode. If the material placed in cell 10 is an electrolyte, a potential will be formed which will be proportional to the logarithm of hydrogen ion concentration or pH of the electrolyte and any means to measure this voltage will give the equivalent pH of the material. The glass electrode of cell 10 makes the internal resistance of such a cell extremely high so that it is necessary to measure the electrode potential while withdrawing substantially no current. In this arrangement battery 11, which is connected in parallel with potentiometer 12, is used to produce a voltage, adjustable by slider 13, which is exactly equal and opposes the potential produced by cell 10. The magnitude of this opposing voltage is indicated as volts or pH by direct current meter 14, which has in series with it a current limiting resistor 15.

If the potential produced by cell 10 does not exactly equal that at slider 13, a potential difference will exist between contact point 16 of the momentary contact switch 17 and point 18, which may be at ground potential and to which the potentiometer 12 is connected. With momentary contact switch 17 in its normal position as indicated, a condenser 19 connected between switch 17 and point 18 will have impressed across it this same voltage. By moving switch 17 to its opposite contact 20, this voltage difference will be transferred by way of isolating condenser 21 to the grid 22 of a three element vacuum tube 23. This transfer of charge to grid 22 will alter the potential of the grid in proportion to the amount by which it differs from the ground potential of point 18. With the release of switch 17 to restore it to its normal position in contact with point 16, leak resistor 24 will discharge the grid circuit back to its normal ground potential. However, during the time in which the potential of grid 22 has been changed from normal, it will have caused a different value of plate current in the circuit formed by plate 25 of tube 23, battery 26 and load resistor 27, which would further result in a momentary amplified flow of current through condenser 28. Current limiting resistor 15 and the resistance of meter 14 are so proportioned that the surge current of condenser 28 will go preferentially through meter 14 and so indicate by surges or momentary deflections of that meter that an unbalance exists between the potentials of the cell 10 and the potentiometer 12.

Figure 3:
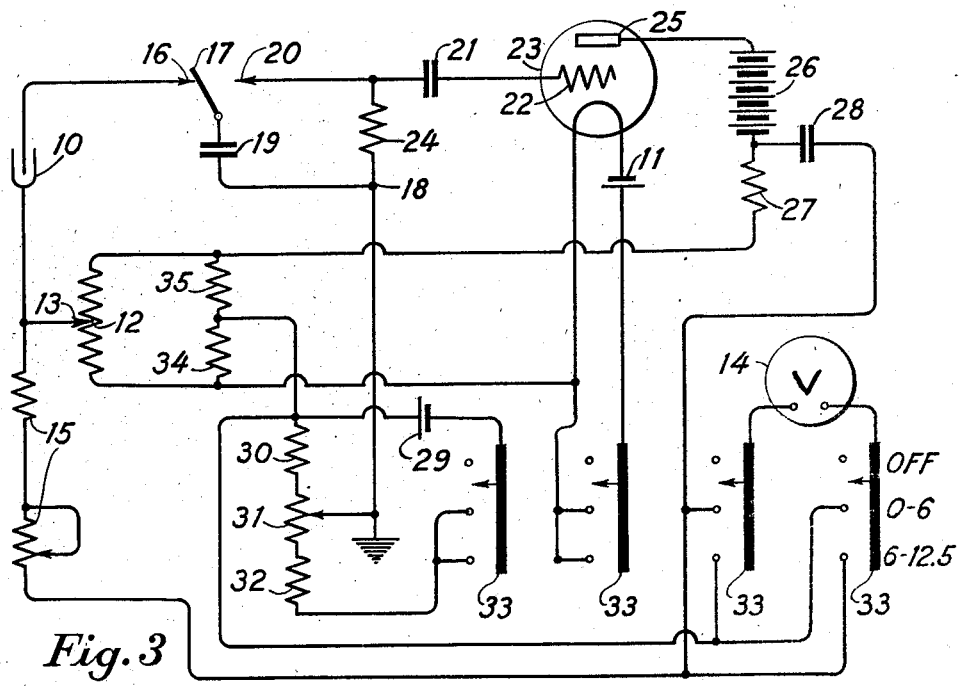
Figure 3 is a connection diagram of a more convenient arrangement of the invention shown in Figure 1.
Figure 2:
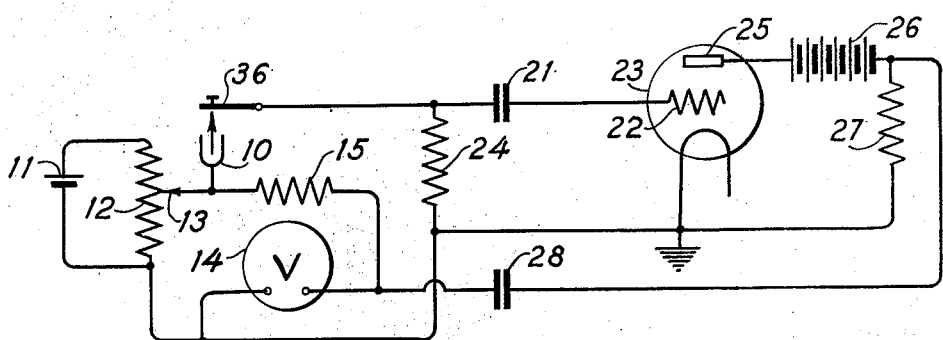
Figure 2 is a connection diagram showing a more simple arrangement of the invention than that shown in Figure 1.

Another arrangement of a circuit which is more simple but somewhat less accurate than that of Figure 1 is illustrated in Figure 2. The principal difference between the two circuits lies in the omission of condenser 19 and the substitution of a single pole single throw contactor 36 for the transfer switch 17. The arrangement of Figure 3 is operated by momentarily closing contactor 36 and thereby impressing the potential existing across the terminals of potentiometer 12 across the pH measuring cell 10. Any difference of potential is impressed upon grid 22 of tube 23 through isolating condenser 21 in the manner described above. In this circuit, leak resistor 24 serves to offer a high resistance path to any current tending to flow through that portion of the circuit which includes pH measuring cell 10 and not only limits the flow of current which may be drawn from that cell, but also serves to produce a potential difference that is adequate to energize grid 22 of the amplifying tube 23.

Meter 14 then serves two purposes. It indicates the approximate magnitude and the direction of potential unbalance by the amount and direction of surge, and when the meter scale is properly calibrated it indicates the voltage equivalent or pH of the electrolyte in cell 10 at balance.

In the arrangement shown in Figure 3 a number of additions are made to make the circuit of Figure 1 more usable. Battery 29 and resistors 30, 31 and 32, are added for the purpose of balancing out the well-known asymmetric potential of cell 10, and also for the purpose of compensating for differences in electrode characteristics. This is accomplished by placing an electrolyte of known pH in cell 10, adjusting meter 14 by means of slider 13 until it indicates this same pH, then by moving the semi-permanent adjustment on resistor 31 to a place where the meter needle no longer surges when momentary switch 17 is operated, the steady reading of meter 14 will indicate true pH over its whole range. In actual operation, the readjustment of asymmetric potential adjuster 31 need be made only at long intervals, months perhaps. In normal use it is only necessary to turn the apparatus on and use it with no preliminary adjustment.

The incorporation of a three position four circuit switch 33 makes it possible to get twice the readable accuracy on meter 14 by means of a reversing circuit and a scale shifting network of resistors 34—35. In the off position, represented by the upper of the three contacts of switch 33, the battery circuits are open and the apparatus is inoperative. Desirably two ranges are incorporated on the meter 14, both of which have pH 6 at the extreme left of the meter scale. With switch 33 in the intermediate position designated 0–6 pH, meter 14 will indicate 6 pH at the left and 0 pH at the extreme right of its scale. With switch 33 in the lower position designated 6–12.5 pH, meter 14 will indicate 6 pH at the left and 12.5 pH at the right end of its scale.

In this invention, meter 14 has been used in place of a standard cell of the prior art. Two advantages accrue from this. First, abuse or aging will have much less effect upon a voltage indicator such as a permanent magnet meter than will those same factors have upon the small and inexpensive type of standard cell generally used in pH indicators. Second, the use of meter 14 eliminates the necessity of standardizing the circuit for changes of battery potential each time the apparatus is used. In the generally used prior circuits this must be done each time prior to the circuit's use because in all cases the battery drain is sufficiently great to cause its voltage to change with use. In this invention a battery voltage change does not matter because the voltage which is actually being used is read as equivalent pH by meter 14 and the total voltage of battery 11 is immaterial as long as it is greater than a minimum of about 1 volt.

The use of battery 29 with resistors 30, 31 and 32 of a high value of resistance make this circuit very voltage stable. In other words, the current drain is made so small for this asymmetric balancing circuit, that its effect is insignificant upon the voltage of battery 29, with the result that checking of this circuit need be done only at long intervals of time, for example months, and then primarily to make sure that the glass electrode of cell 10 has not changed its characteristics.

It will be appreciated that the application of this invention is not limited to pH meters but may be made to any situation where an unknown potential in a high resistance circuit is to be determined with a high degree of accuracy and with a minimum of delicate apparatus and manual manipulations.

Although a single embodiment is indicated and described, it will be obvious that many changes and alterations could be made without departing from the spirit of the invention, and all those changes that come within the scope of the following claims are embraced thereby.

I claim:

1. An apparatus for indicating a balance between a pair of opposable electric potential sources, one of which is variable in magnitude, comprising a voltage indicating means in parallel with said variable potential source, a first condenser, means for momentarily impressing a difference in potential between said potential sources on said first condenser to charge the same, a voltage amplifying means, means for transferring said first condenser charge to the input of said amplifying means to impress a momentary potential thereon, and a second condenser connected to the output of said amplifying means and to said voltage indicating means, so constructed and arranged that said voltage indicating means indicates a balanced condition between said potential sources when its indication remains constant upon actuation of said first condenser charge transferring means.

2. An apparatus according to claim 1 in which said voltage indicator comprises a high-resistance, moving-coil, permanent-magnet type indicating voltmeter.

3. An apparatus according to claim 1 in which said amplifying means comprises a three-element vacuum tube.

4. An apparatus according to claim 1 in which said second condenser is connected to a resistor in the output circuit of said amplifying means and is adapted to be charged by a momentary potential change across said resistor due to the potential change impressed upon the input of said amplifier by said first condenser.

5. A potential measuring apparatus for a potential source such as a pH measuring cell comprising a potentiometer, a source of E. M. F. for said potentiometer, a voltmeter for indicating the potential across said potentiometer terminals, a voltage amplifier, a contactor for connecting said potentiometer terminals in opposition to said potential source, means connecting said contactor to the input of said voltage amplifier, said contactor and said means being effective momentarily to impress any potential difference which may exist between said potential source and said potentiometer terminals upon said amplifier, and means for impressing the amplified voltage impulse onto said potentiometer voltmeter to cause a momentary deflection thereof that indicates the direction and substantially the degree of unbalance between said potential source and said potentiometer.

6. An apparatus according to claim 5 in which said amplifier input and said amplifier output are separated, respectively, from said momentary contactor and said voltmeter, by condensers.

7. An apparatus according to claim 5 in which the output circuit of said amplifier includes a resistor, and said voltmeter is connected to the terminals of said resistor through a condenser so as to be momentarily deflected by a potential change across said resistor terminals.

8. An apparatus according to claim 5 including a high resistance in series with said potential source and said contactor.

9. A potential measuring apparatus for an unknown potential source such as a pH measuring cell, comprising a variable potential source, a potential indicator for said source, a voltage amplifier, a contactor for connecting said variable potential source in opposition to said unknown potential source, means connecting said contactor to the input of said voltage amplifier, said contactor and said connecting means being effective momentarily to impress a potential difference which may exist between said unknown potential and said variable potential sources upon said amplifier, and means for impressing the amplified voltage impulse onto said potential indicator to cause a momentary deflection thereof that indicates the direction and substantially the degree of unbalance between said variable and said unknown potential sources.

10. An apparatus according to claim 9 in which the contactor and means for connecting said variable potential and said unknown potential sources in opposition and to said voltage amplifier includes a current limiting means for providing a potential difference to actuate said voltage amplifier.

11. An apparatus according to claim 9 in which the contactor and means for connecting said variable potential and said unknown potential sources in opposition and to said voltage amplifier includes a condenser adapted to be charged by said potential difference, and to be discharged to actuate said voltage amplifier.

12. An apparatus according to claim 9 in which the contactor and means for connecting said variable potential and said unknown potential sources in opposition and to said voltage amplifier includes a resistor for providing a potential difference to actuate said voltage amplifier.

KENNETH R. ELDREDGE.